(12) United States Patent
Smith et al.

(10) Patent No.: US 6,273,035 B1
(45) Date of Patent: Aug. 14, 2001

(54) INTERNAL COMBUSTION ENGINE WITH INDUCTION SYSTEM HEAT SINK

(75) Inventors: Clyde J. Smith, Chandler; Mark D. Jankowski, Phoenix; William E. Gest, Fountain Hills, all of AZ (US)

(73) Assignee: MTD Products, Inc., Cleveland, OH (US)

( * ) Notice: Subject to any disclaimer, the term of this patent is extended or adjusted under 35 U.S.C. 154(b) by 0 days.

(21) Appl. No.: 09/441,750

(22) Filed: Nov. 17, 1999

(51) Int. Cl.[7] ....................................................... F01P 7/04
(52) U.S. Cl. ........................................ 123/41.65; 123/540
(58) Field of Search ............................... 123/41.65, 41.69, 123/540, 541, 542

(56) References Cited

U.S. PATENT DOCUMENTS

| | | | |
|---|---|---|---|
| 4,218,406 | * 8/1980 | Detweiler | 261/39.3 |
| 4,356,806 | * 11/1982 | Freesh | 123/568.12 |
| 4,414,163 | * 11/1983 | Barr et al. | 261/69.2 |
| 4,739,732 | * 4/1988 | Nakamura et al. | 123/73 V |
| 5,699,761 | * 12/1997 | Yamaguchi et al. | 123/73 A |
| 5,803,035 | * 9/1998 | Guntly | 123/179.11 |

* cited by examiner

Primary Examiner—Noah P. Kamen
(74) Attorney, Agent, or Firm—Brooks & Kushman P.C.

(57) ABSTRACT

A first and second baffle formed of a thin sheet metal material are introduced into an engine induction system on the upstream side of air fuel metering device and interposed between the air fuel metering device and a tubular intake runner in order to prevent post engine shut down fuel boiling. The first and second baffles absorb heat from the induction system and dissipate heat to the surrounding atmosphere. The first and second baffles are sized sufficiently large to limit peak fuel temperature in the fuel metering device 130° F. when a hot engine is shut down in a 70° F. environment.

9 Claims, 3 Drawing Sheets

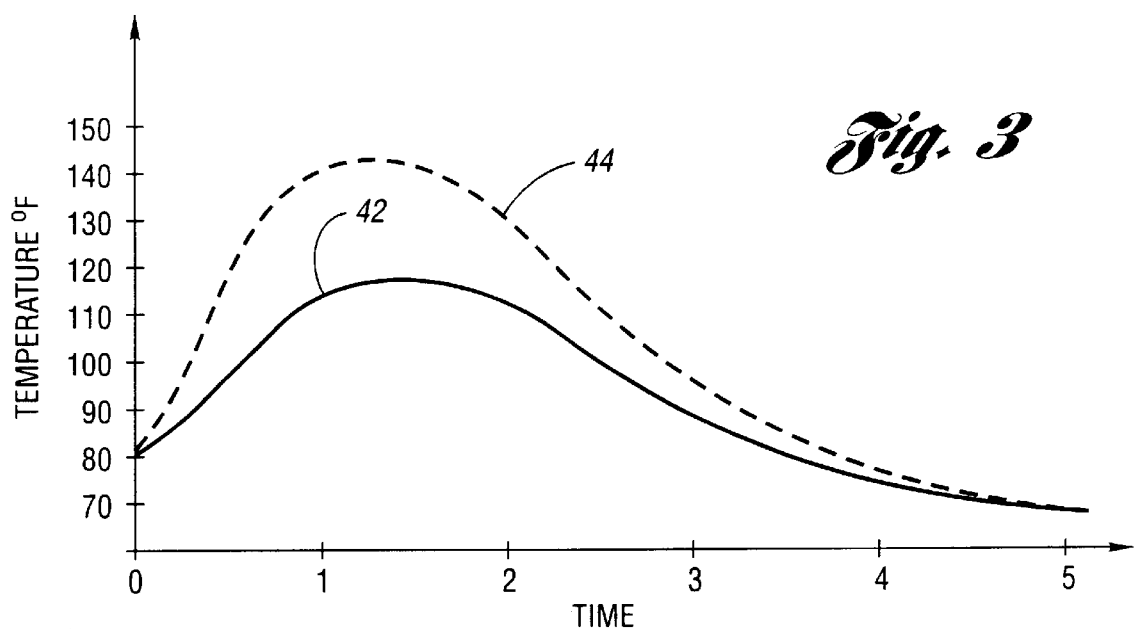
Fig. 3
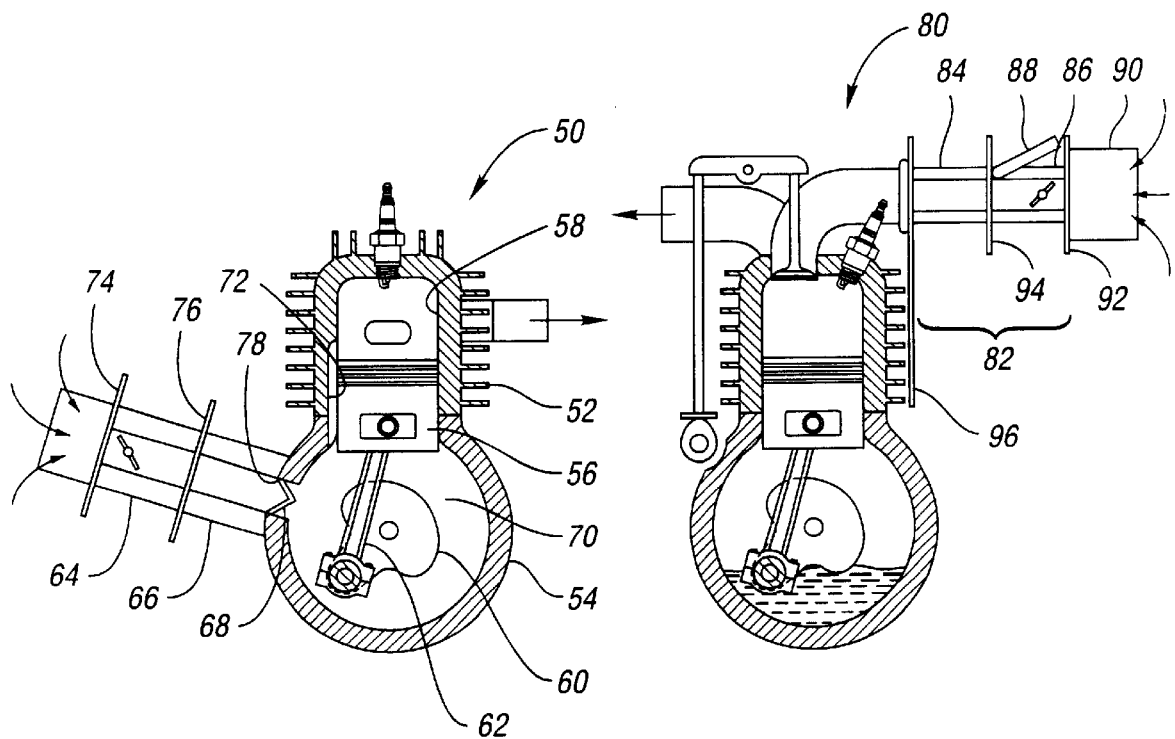
Fig. 4
Fig. 5

INTERNAL COMBUSTION ENGINE WITH INDUCTION SYSTEM HEAT SINK

TECHNICAL FIELD

This invention relates to heat sinks for internal combustion engine induction systems, and more particularly, to heat sinks for a single cylinder air cooled engine.

BACKGROUND ART

Small engines, particularly small single cylinder air cooled spark ignited engines used in portable or operator carried power tools, are typically very compact and have the fuel metering device such as a carburetor or injector located in close proximity to the engine block. When these engines are shut down, the forced air cooling caused by the engine fan stops. As the engine cools in this post shut down soak period, the fuel metering device tends to initially rise in temperature before subsequently, gradually cooling off. This temperature rise particularly when fuel metering devices in close thermal proximity to the engine block can cause the fuel metering device such as a carburetor or the like, to become so hot that the residual fuel contained therein boils out. This fuel loss not only contributes to evaporative emissions, but can make the engine difficult to restart.

DISCLOSURE OF INVENTION

Accordingly, it is an object of the present invention to provide a single cylinder air cooled spark ignited engine having an improved induction system which limits the peak temperature of the fuel metering device during the post engine shut down soak.

It is a further object of the present invention to provide an induction system which maintains post shut down peak temperature of the engine fuel metering device to below 130° F. while maintaining a compact engine configuration.

Accordingly, a single cylinder air cooled spark ignition engine is provided with an engine block having an intake port for receiving an air fuel mixture to be burned. A tubular non-metallic intake runner is provided between the engine block and the air fuel metering device which supplies a mixture of air and fuel to the engine block intake port. A first baffle of thin sheet metal material is affixed to the air metering device inlet. A second baffle formed of thin sheet metal material is interposed between the air metering device and the tubular runner so that the first and second baffles absorb heat and dissipate the heat to the atmosphere when the engine is shut off. The baffles are of sufficient size so that after running the engine at a hot equilibrium state in a 70° F. atmosphere, the baffles limit the peak temperature of the fuel within the air fuel metering device to 130° F.

BRIEF DESCRIPTION OF DRAWINGS

FIG. 3 is an illustrative drawing showing the effect of the invention of post shut down fuel temperature.

FIG. 4 is a schematic illustration related to a two-cycle reed valve engine employing the present invention; and FIG. 5 is a schematic illustration of a four cycle fuel injected engine employing the present invention.

BEST MODE FOR CARRYING OUT THE INVENTION

Figure 1:
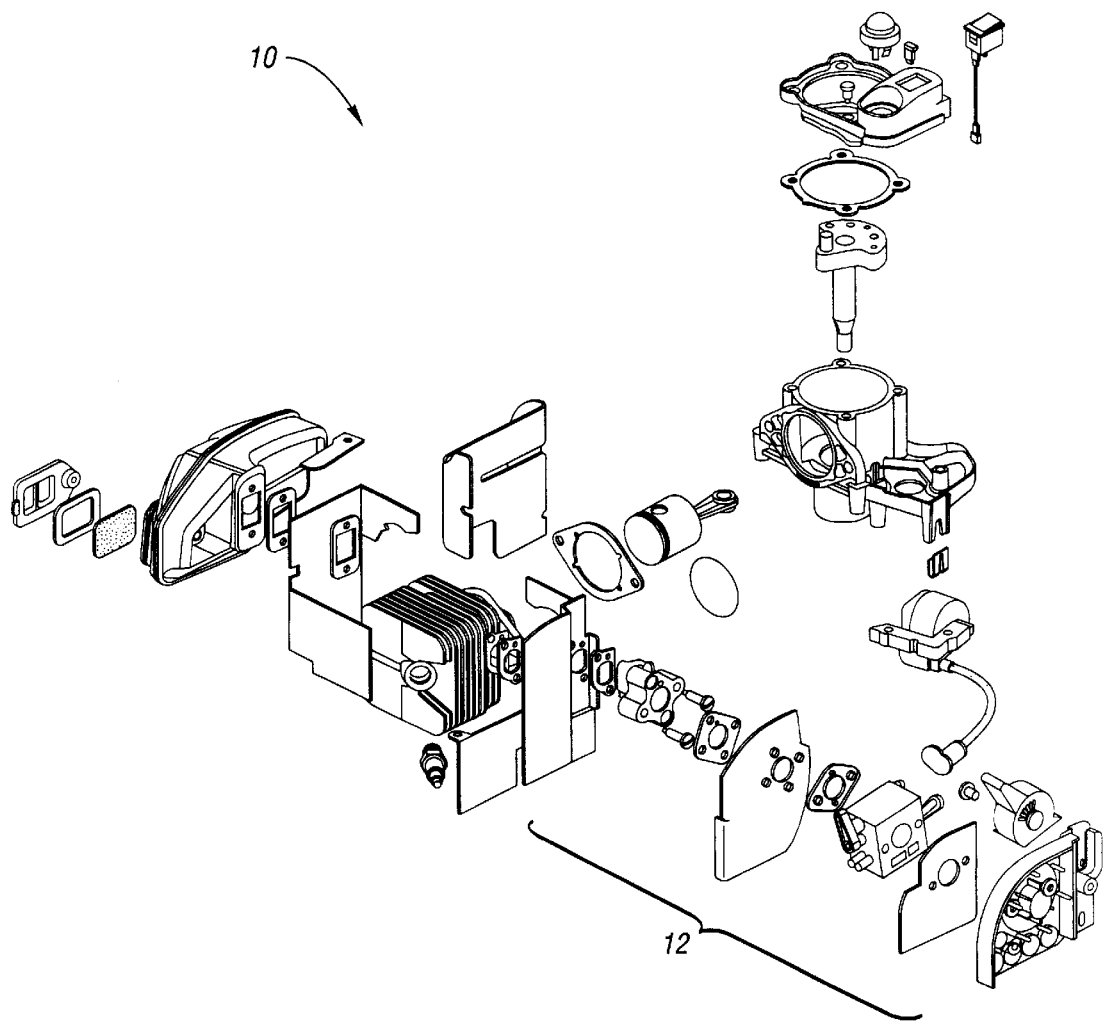
FIG. 1 is an exploded perspective view showing an engine incorporating the present invention.
Figure 1:
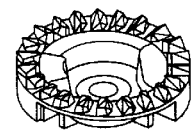
Figure 2:
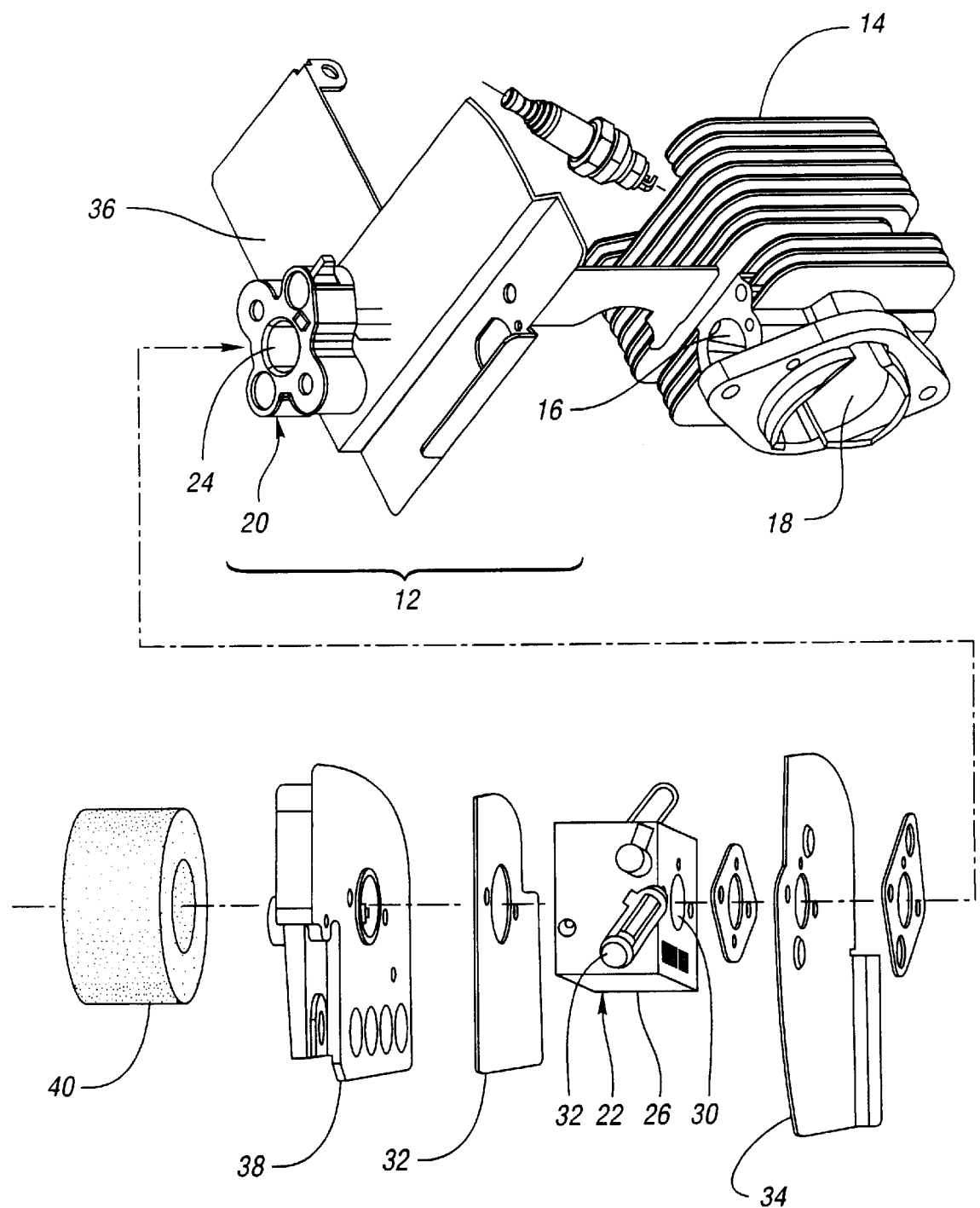
FIG. 2 is an enlarged view of the components which make up the induction system and their proximity to the engine block intake port.

In FIGS. 1 and 2, a preferred embodiment of the invention is illustrated in a single cylinder, air cooled two cycle spark ignited internal combustion engine 10. Engine 10 is shown in an exploded view in order to best illustrate the components which make up the novel induction system 12. Induction system 12 is shown in enlarged view in FIG. 2 adjacent to the engine cylinder 14 which is provided with an intake port 16 which opens into internal cylinder cavity 18. The induction system 12 is made up of two main components; a tubular intake runner 20 and an air fuel metering device. In the embodiment illustrated, the air fuel metering device utilized is a carburetor 22.

Intake runner 20 is generally tubular in shape with a central passageway formed there through, having inlet 24 for receiving an air fuel mixture and an outlet at the opposite end of the intake runner (not shown) which is fluid communication with intake port 16. Preferably, the tubular runner 20 is made of a low thermally conductive material such as phenolic. The air fuel metering device, namely, carburetor 22, is provided with a body 26 having an air inlet internal throttle for controlling air flow, a fuel inlet 28, fuel control such as a conventional venturi jet for regulating a flow of fuel in proportion to the flow of air, and air fuel mixture outlet 30 which is oriented in fluid communication with the inlet 24 of intake runner 20.

A first baffle 32 formed of a thin metal sheet is affixed to the carburetor inlet end. The first baffle extends outwardly from the carburetor 22 in a heat transfer relationship to the surrounding atmosphere. A second baffle 34, similarly formed of a thin sheet metal material, is affixed to and interposed between the carburetor 22 and tubular runner 20. The second baffle likewise extends outward from the carburetor and heat transfer relationship with the surrounding atmosphere. Preferably, the first and second baffles are formed of non-corrosive metal with good thermal conductivity such as aluminum having a thickness of 0.01 to 0.1 inches. Alternatively, other metals which are suitably non-corrosive are utilized such as galvanized steel.

The first and second baffles, 32 and 34, are sized sufficiently large relative to the engine, the air metering device and the length and thermal conductivity of the intake runner so that when the engine is turned off after running in a 70° F. atmosphere in a typical loaded condition for a sufficient length of time to reach an equilibrium hot operating state, the fuel within the air metering device will not reach a temperature in excess of 130° F. Preferably, the first and second baffles will be sufficiently large so that the peak post shut down fuel temperature of the fuel within the air fuel metering device does not exceed 120° F.

In the preferred embodiment illustrated in FIGS. 1 and 2, a third baffle 36 is provided and oriented between the intake runner 20 and intake port 16 formed in the engine block. The third baffle further serves to absorb and dissipate heat from the engine block after it is shut down while also serving as a shroud to direct cooling air when the engine is operating and to limit direct thermal radiation from the engine block to the air fuel metering device. Third baffle 36 is preferably likewise formed of a thin sheet metal material such as aluminum or galvanized steel. As illustrated in FIGS. 1 and 2, the induction system 12 further includes a series of conventional gaskets, an air filter housing 38 and air filter element 40.

The effect of first and second baffles 32 and 34 on fuel temperature within the carburetor 22 is illustrated in FIG. 3. FIG. 3 is a plot of fuel temperature within the carburetor with time "0" representing the time the engine is shut off after being operated at a steady state high speed loaded condition so that the engine is in a typical fully heated state.

With the passage of time, the engine block cools, conducting heat which causes the fuel in the carburetor to heat up before eventually cooling off to atmospheric temperature. Peak fuel temperature typically occurs 15 to 20 minutes after engine shut down. The solid line 42 represents the fuel temperature within the carburetor utilizing the present invention. The dotted line 44 represents fuel temperature with the first and second baffles removed and all else being equal. It should be appreciated, of course, that peak fuel temperature will be affected by other factors such as tubular intake runner length. The longer the intake runner and the better the insulator, i.e. the lower the thermal conductivity of the runner material, the lower the peak fuel temperature reached during a hot soak. The present invention allows a short tubular runner to be used resulting in a very compact engine configuration without causing hot soak fuel boiling.

FIGS. 4 and 5 illustrate alternative engine embodiments employing the present invention. FIG. 4 illustrates a two cycle reed valve engine 50 while FIG. 5 illustrates a four cycle fuel injected engine 80. These engines like the two cycle third port engine illustrated in FIGS. 1 and 2 can benefit from the use of the present invention to dissipate heat from the induction system to prevent post shut down fuel boiling.

FIG. 4 schematically shows a two-cycle reed valve engine 50 incorporating the present invention. The engine is provided with a block which includes a cylinder portion 52 and a crankcase 54. A piston 56 reciprocates within a cylindrical bore 58 in the engine block cylinder portion 52. A rotary crank shaft 60 and a connecting rod 62 operate in a conventional manner. The induction system is made up of a fuel metering device which is carburetor 64, tubular runner 66 and a reed valve assembly 68 which allows intake charge to enter into the internal cavity 70 within the crankcase 54 while preventing the discharge of air fuel mixture out through the reed valve 68. In the reed valve engine illustrated, the intake charge blows from crankcase 70 to the combustion chamber bounded by internal cylindrical bore 58 and the top of piston 56 through transfer ports 72 when the piston is in the lower most portion of its track, as is conventional in this type of engine. Like engine 10 described with reference to FIGS. 1 and 2, two-cycle reed valve engine 50 is provided with a first baffle 74 adjacent the inlet side of the carburetor 64. A second baffle 76 interposed between carburetor 64 and tubular runner 66 and a third baffle 78 which is optional, located between tubular runner 66 and reed valve assembly 68 and crankcase 54. The first, second and third baffles 74, 76, and 78, respectively, are each formed of a thin sheet metal material such as aluminum and the like and projected outwardly from the carburetor and the tubular runner into heat transfer relation with the adjacent atmosphere. Unlike the baffles described with reference to engine 10, baffles associated with two-cycle reed valve engine 50 are likewise sized sufficiently large to limit the post shut down peak fuel temperature within the carburetor or other fuel metering device to 130° F. and most preferably, to 120° F., when a hot engine is shut down in a 70° F. atmosphere.

FIG. 5 illustrates a small single cylinder four-cycle engine utilizing the present invention to limit the post shut down fuel boiling. Engine 80 operates in a typical four stroke cycle as is generally described in U.S. Pat. Nos. 5,241,932; 5,558,057 and 5,738,062. Induction system 82 is made up of a tubular runner 84. Preferably, tubular runner 84 is formed of a non-metallic material having low thermal conductivity. Oriented adjacent to tubular 84 is a fuel metering device which in the embodiment illustrated, is a fuel injector throttle body 86 which is provided with an internal throttle for regulating air flow and a fuel injector nozzle 88 for introducing a controlled amount of fuel proportional to the air flow in order to maintain a proper air fuel ratio in the intake charge. Air filter 90 is provided at the inlet end of throttle body 86 as described with reference to the earlier embodiments, engine 10 and 50. Engine 80 is provided with two and preferably three baffles. First baffle 92 positioned at the upstream side of the throttle body 86, second baffle 94 positioned between throttle body 86 and tubular runner 84, and a third baffle 96 oriented between tubular runner 84 and the intake port in the engine block. Baffles 92, 94 and 96 are formed of thin sheet metal material such as aluminum or the like, and are sized to absorb and dissipate heat through the atmosphere when the engine is shut down, limiting the peak fuel temperature of the fuel within injector 88 to 130° F. and preferably, 120° F. when the engine is shut down after being fully heated after a period of operation in a 70° F. atmosphere.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A single cylinder air-cooled, spark ignited internal combustion engine comprising:

an engine block having an intake port for receiving an air fuel mixture to be burned;

a tubular non-metallic intake runner provided with an inlet for the air fuel mixture and an outlet in fluid communication with the intake port of the engine block;

an air fuel metering device having a body with an air inlet, a fuel inlet, a throttle for controlling air flow, a fuel control for regulating the flow of fuel in proportion to the flow of air, and an air fuel mixture outlet in fluid communication with the intake runner inlet;

a first baffle formed of thin sheet metal affixed to the air fuel metering device adjacent the air inlet and extending outwardly therefrom in heat transfer relationship to the air fuel metering device and the surrounding atmosphere;

a second baffle formed of thin sheet metal affixed to and interposed between the air fuel metering device and the tubular runner and extending outwardly therefrom in heat transfer relationship to the air fuel metering device and the surrounding atmosphere;

wherein the first and second baffles are sized sufficiently large relative to the engine and to the air metering device so that when the engine is turned off after running at a full speed loaded condition for a sufficient length of time to reach an equilibrium state in a 70° F. atmosphere, a peak operating temperature of the fuel within the air fuel metering device will not exceed 130° F.

2. The engine of claim 1 further comprising a third baffle formed of thin sheet metal material affixed to and interposed between the tubular runner outlet and the engine block intake port and extending generally outwardly therefrom in heat transfer relationship to the surrounding atmosphere.

3. The engine of claim 1 wherein the peak temperature of the fuel within the air fuel metering device does not exceed 120° F., after the engine is shut off.

4. The engine of claim 1 wherein the first and second baffles are formed of aluminum.

5. The engine of claim 1 wherein the air fuel metering device is the carburetor.

6. The engine of claim 1 wherein the air fuel metering device is a throttle body and a fuel injector.

7. The engine of claim 1 wherein the engine is a third port two-cycle construction.

8. The engine of claim 1 where the engine is a reed valve two-cycle construction.

9. The engine of claim 1 wherein the engine is a four-cycle construction.

* * * * *